US012809324B2

(12) United States Patent
Gaffoor et al.

(10) Patent No.: US 12,809,324 B2
(45) Date of Patent: Nov. 24, 2026

(54) PREDICTIVE MODELING AND CONTROL FOR WATER RESOURCE INFRASTRUCTURE

(71) Applicant: Autodesk, Inc., San Francisco, CA (US)

(72) Inventors: Thouheed Abdul Gaffoor, Mississauga (CA); Megh Suthar, Toronto (CA); Yousra Hazem Khalil Helmy Mohamed, Mississauga (CA)

(73) Assignee: AUTODESK, INC., San Francisco, CA (US)

( * ) Notice: Subject to any disclaimer, the term of this patent is extended or adjusted under 35 U.S.C. 154(b) by 416 days.

(21) Appl. No.: 18/509,091

(22) Filed: Nov. 14, 2023

(65) Prior Publication Data

US 2024/0085870 A1 Mar. 14, 2024

Related U.S. Application Data

(63) Continuation of application No. 18/171,971, filed on Feb. 21, 2023, now Pat. No. 11,815,863, which is a (Continued)

(51) Int. Cl.
*G05B 13/04* (2006.01)
*G05B 13/02* (2006.01)
(Continued)

(52) U.S. Cl.
CPC ....... *G05B 13/048* (2013.01); *G05B 13/0265* (2013.01); *G06N 5/04* (2013.01);
(Continued)

(58) Field of Classification Search
CPC ....... E03B 7/02; E03B 7/075; G05B 13/0265; G05B 13/048; G06N 20/00; G06N 5/04
See application file for complete search history.

(56) References Cited

U.S. PATENT DOCUMENTS 6,785,592 B1 8/2004 Smith et al.
9,928,467 B2 * 3/2018 Kang .................... G06N 20/00
(Continued)

FOREIGN PATENT DOCUMENTS

EP 2296063 3/2011

OTHER PUBLICATIONS

European Communication under Rule 71(3) EPC dated Oct. 8, 2024 for European Patent Application No. 18813967.9.
(Continued)

*Primary Examiner* — Vincent H Tran
(74) *Attorney, Agent, or Firm* — Gates & Cooper LLP

(57) ABSTRACT

A system and method control a water resource infrastructure (WRI). The WRI has infrastructure components that are actuatable to cause a change to the WRI. A monitoring system has sensors that collect operating data that describes a state of the infrastructure components. A disturbance data provider provides disturbance data that may be expected to have an impact on operational parameters of the infrastructure components. A control mechanism scheduler receives the disturbance data and the operating data, trains to generate a schedule of setpoints for a control system in accordance with approaching a predetermined objective, and retrieves and outputs the schedule of setpoints in response to receiving real-time operational data. A control system receives the schedule of setpoints controls the infrastructure components based thereon.

16 Claims, 7 Drawing Sheets

Related U.S. Application Data continuation of application No. 16/620,421, filed as application No. PCT/IB2018/054166 on Jun. 8, 2018, now Pat. No. 11,586,163.

(60) Provisional application No. 62/517,514, filed on Jun. 9, 2017.

(51) Int. Cl.

| | |
|---|---|
| ***G06N 5/04*** | (2023.01) |
| ***G06N 20/00*** | (2019.01) |
| *E03B 7/02* | (2006.01) |
| *E03B 7/07* | (2006.01) |

(52) U.S. Cl.

CPC ................ *G06N 20/00* (2019.01); *E03B 7/02* (2013.01); *E03B 7/075* (2013.01)

(56) References Cited

U.S. PATENT DOCUMENTS

2002/0164070 A1 11/2002 Kuhner et al.
2012/0232701 A1* 9/2012 Carty ................ G05D 23/1917 700/277
2016/0098022 A1 4/2016 Wenzel et al.
2016/0103452 A1* 4/2016 Kang .................. G05D 7/0635 700/282
2018/0204116 A1* 7/2018 Evans .................... G06N 3/045

OTHER PUBLICATIONS

Canadian Examination Report dated Jun. 27, 2024 for Canadian Patent Application No. 3,066,544.
Canadian Examination Report dated Aug. 21, 2023 for Canadian Patent Application No. 3,066,544.
European Decision to Grant dated Jan. 16, 2025 for European Patent Application No. 18813967.9.
European Communication under Rule 71(3) EPC dated May 13, 2024 for European Patent Application No. 18813967.9.
European Examination Report dated Aug. 29, 2022 for European Patent Application No. 18813967.9.
Extended European Search Report dated Feb. 4, 2021 for European Patent Application No. 18813967.9.
Canadian Notice of Allowance dated Nov. 20, 2025 for Canadian Patent Application No. 3,066,544.

* cited by examiner

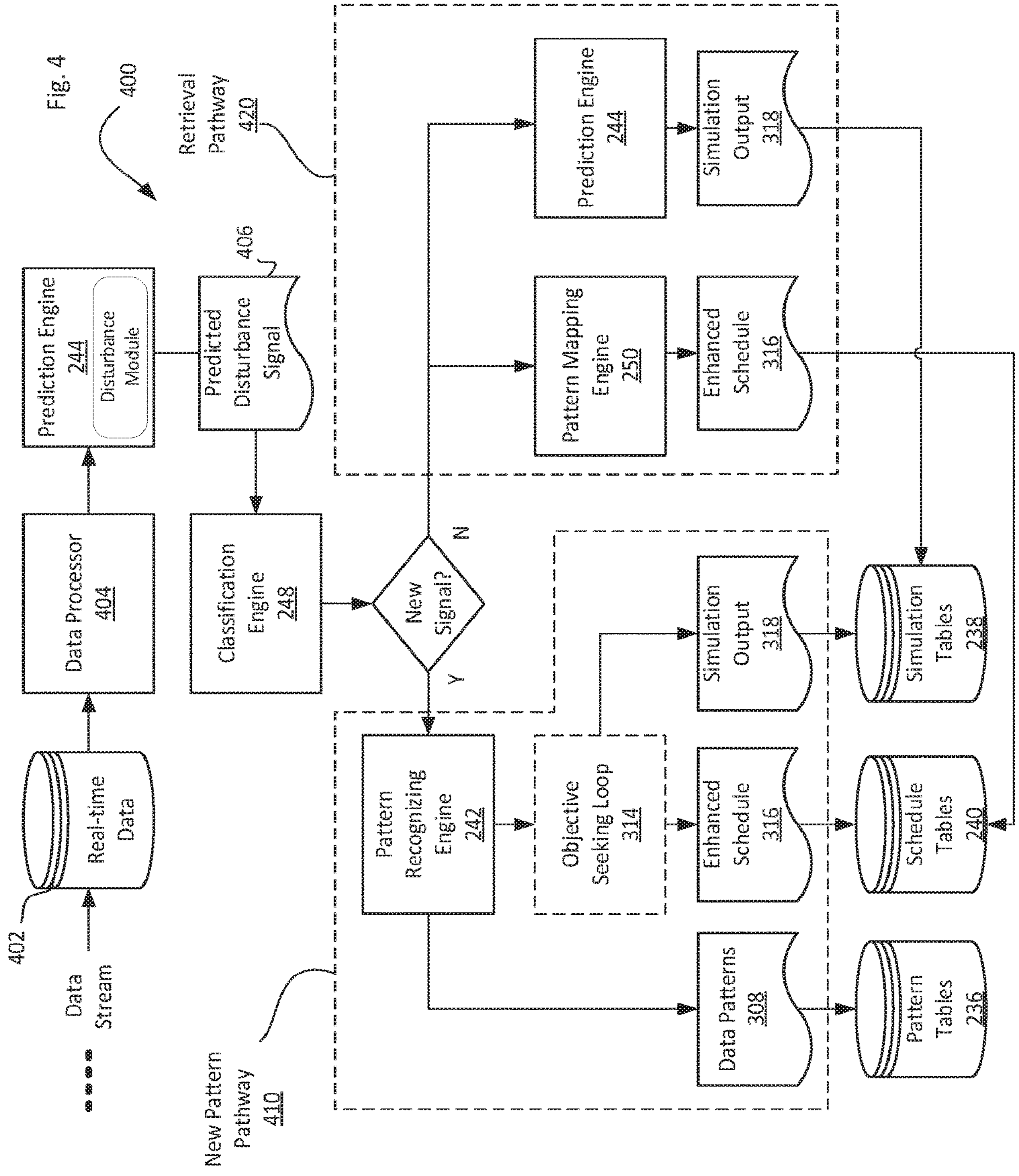
Fig. 4
400
Data Stream
402
Real-time Data
Data Processor 404
Prediction Engine 244
Disturbance Module
Predicted Disturbance Signal
406
Classification Engine 248
New Signal?
Y
N
Retrieval Pathway 420
Pattern Mapping Engine 250
Enhanced Schedule 316
Prediction Engine 244
Simulation Output 318
New Pattern Pathway 410
Pattern Recognizing Engine 242
Objective Seeking Loop 314
Simulation Output 318
Enhanced Schedule 316
Data Patterns 308
Simulation Tables 238
Schedule Tables 240
Pattern Tables 236

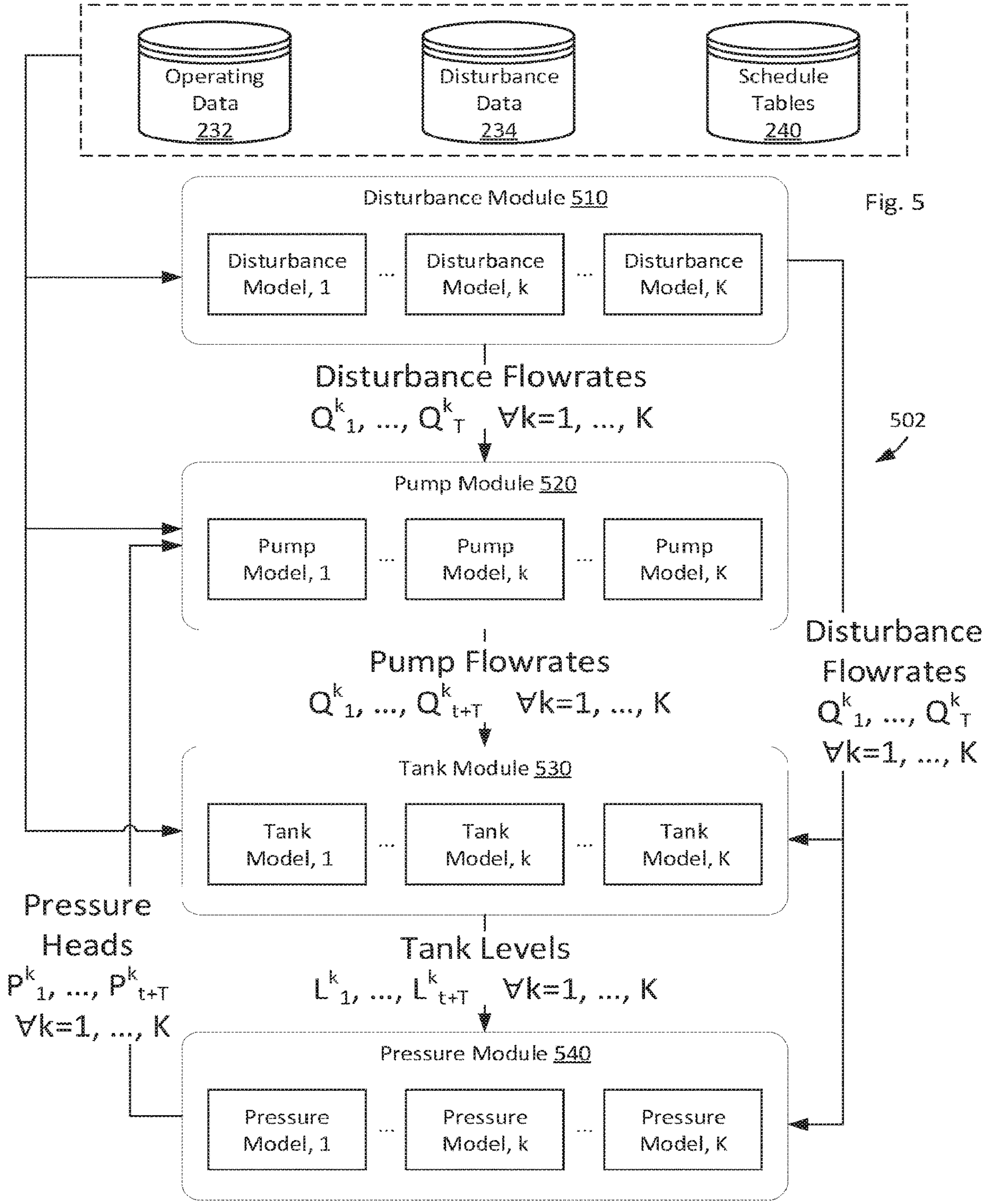
Operating
Data
232
Disturbance
Data
234
Schedule
Tables
240
Disturbance Module 510
Disturbance
Model, 1
Disturbance
Model, k
Disturbance
Model, K
Fig. 5
Disturbance Flowrates
Q^k_1, ..., Q^k_T ∀k=1, ..., K
502
Pump Module 520
Pump
Model, 1
Pump
Model, k
Pump
Model, K
Pump Flowrates
Q^k_1, ..., Q^k_t+T ∀k=1, ..., K
Disturbance
Flowrates
Q^k_1, ..., Q^k_T
∀k=1, ..., K
Tank Module 530
Tank
Model, 1
Tank
Model, k
Tank
Model, K
Pressure
Heads
P^k_1, ..., P^k_t+T
∀k=1, ..., K
Tank Levels
L^k_1, ..., L^k_t+T ∀k=1, ..., K
Pressure Module 540
Pressure
Model, 1
Pressure
Model, k
Pressure
Model, K

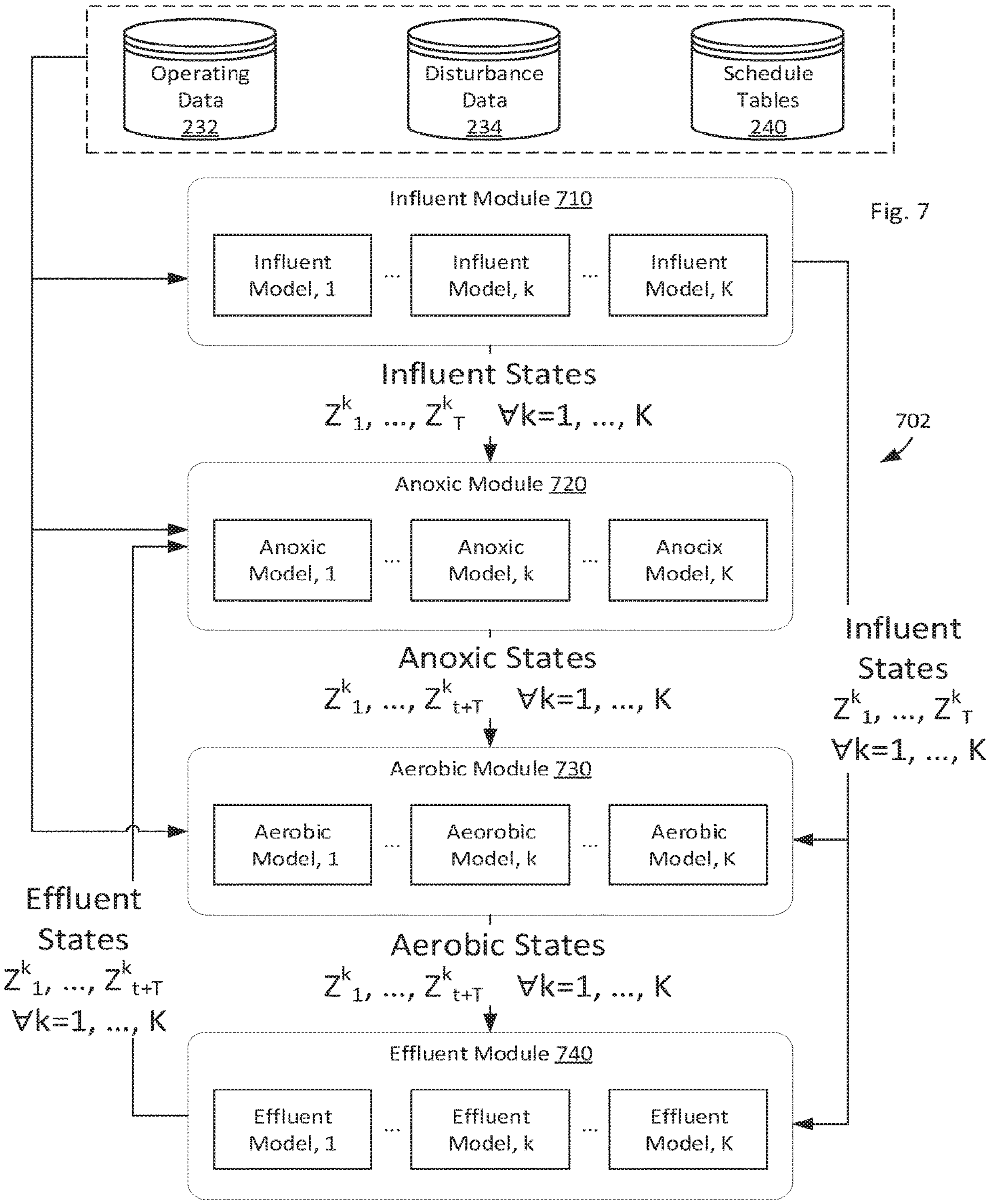

Operating Data 232
Disturbance Data 234
Schedule Tables 240
Influent Module 710
Influent Model, 1
Influent Model, k
Influent Model, K
Fig. 7
Influent States
$Z^k_1, \ldots, Z^k_T \quad \forall k=1, \ldots, K$
702
Anoxic Module 720
Anoxic Model, 1
Anoxic Model, k
Anocix Model, K
Anoxic States
$Z^k_1, \ldots, Z^k_{t+T} \quad \forall k=1, \ldots, K$
Influent States
$Z^k_1, \ldots, Z^k_T$
$\forall k=1, \ldots, K$
Aerobic Module 730
Aerobic Model, 1
Aeorobic Model, k
Aerobic Model, K
Effluent States
$Z^k_1, \ldots, Z^k_{t+T}$
$\forall k=1, \ldots, K$
Aerobic States
$Z^k_1, \ldots, Z^k_{t+T} \quad \forall k=1, \ldots, K$
Effluent Module 740
Effluent Model, 1
Effluent Model, k
Effluent Model, K

PREDICTIVE MODELING AND CONTROL FOR WATER RESOURCE INFRASTRUCTURE

CROSS-REFERENCE TO RELATED APPLICATIONS

This application is a continuation under 35 U.S.C. § 120 of application Ser. No. 18/171,971, filed on Feb. 21, 2023, which issued on Nov. 14, 2023 as U.S. Pat. No. 11,815,863 with inventor(s) Thouheed Abdul Gaffoor, Megh Suthar, and Yousra Hazem Khalil Helmy Mohamed, entitled "Predictive Modelling and Control for Water Resource Infrastructure," which application is incorporated by reference herein, and which application is a continuation under 35 U.S.C. § 120 of application Ser. No. 16/620,421, filed on Dec. 6, 2019, which issued Feb. 21, 2023 as U.S. Pat. No. 11,586,163 with inventor(s) Thouheed Abdul Gaffoor, Megh Suthar, and Yousra Hazem Khalil Helmy Mohamed, entitled "Predictive Modelling and Control for Water Resource Infrastructure," which application is incorporated by reference herein, and which application is a 371 of PCT/IB2018/054166 filed on Jun. 8, 2018, which application claims the benefit of 62/517,514 filed on Jun. 9, 2017, which applications are incorporated by reference herein.

FIELD OF THE INVENTION

The present invention relates to control systems, and in particular to control systems involving predictive modelling.

BACKGROUND

Control systems for water resource infrastructures (WRIs), such as municipal water distribution systems, wastewater treatment facilities, drinking water treatment plants, or sewage collection systems, typically integrate with several key infrastructure components which function together to meet system demands. The term actuable infrastructure components may be used to refer to the infrastructure components of the WRI which include control mechanisms which can be actuated to cause a change in the system, such as a pump which can be switched on/off, or a valve which can be opened/closed. For example, a municipal water distribution system typically has a water reservoir from which water may be drawn, pumps to transport water to end users, district-metered areas (DMAs) where water is consumed by end users, and storage tanks for storing water and maintaining a pressure head.

The actuable infrastructure components have control mechanisms which can be controlled manually in response to system demands. In the example of a municipal water distribution system, additional pumps may be switched online to handle rising water demand, and control valves may be opened or closed to redirect water flow.

Attempts have been made to model WRIs to aid in the manual control of key infrastructure components with the aim of efficiently utilizing key infrastructure components. Such models have traditionally involved large and complex physically-based numerical models derived from scientific relationships defining system characteristics. Since these traditional models rely on physical modeling, an extensive process is required to design, calibrate, build, and tune the numerical models to match reality, which is a cumbersome and expensive process. Such models often require a large number of parameters that are not directly measurable, or difficult to measure. Further, such models may be computationally inefficient since they may require long simulation execution times to retrieve meaningful results. Such models can also become overparameterized, leading to computational difficulties. These traditional models often require significant staff resources to maintain functionality over time, and are typically not available for integration with enhancement routines or Supervisory Control and Data Acquisition (SCADA) systems, rendering them difficult to implement in real-time.

SUMMARY OF THE INVENTION

A control mechanism scheduler for a water resource infrastructure receives operating data and disturbance data, the operating data describing infrastructure components of the water resource infrastructure, the disturbance data comprising a disturbance signal describing a disturbance expected to disturb the water resource infrastructure. The control mechanism scheduler generates classes for disturbance signals, generates simulations of the water resource infrastructure, and generates schedules of setpoints for control mechanisms actuable to control the infrastructure components of the water resource infrastructure in accordance with approaching a predetermined objective.

BRIEF DESCRIPTION OF THE DRAWINGS

Non-limiting embodiments of the present invention will now be described, by way of example only, with reference to the attached Figures, wherein:

FIG. 4 is a schematic diagram of an example process for generating a schedule of setpoints of control mechanisms of a water resource infrastructure.

FIG. 5 is a schematic diagram of an example process for generating a simulation of the water resource infrastructure of FIG. 1.

FIG. 7 is a schematic diagram of an example process for generating a simulation of the water resource infrastructure of FIG. 6.

DETAILED DESCRIPTION

Water resource infrastructures, such as municipal water distribution networks and water treatment plants, experience disturbances which may impact the functioning of the water resource infrastructure. Control mechanisms in infrastructure components in the water resource infrastructure may be manually actuated to compensate for such disturbances. For example, additional pumping may be brought online to tap into water reservoirs to provide water to a municipality during a particularly hot day. However, manual control of such infrastructure components may be costly and prone to error.

A system may be trained to automatically generate a schedule of setpoints for control mechanisms to control such infrastructure components in accordance with some predetermined objective. The objective may be, for example, to improve reliability, reduce maintenance downtime, or reduce operating costs. The system may be trained to be responsive to even minor disturbances. Such objectives may include maintaining the water resource infrastructure within regulatory restraints.

The system may receive disturbance data, which may include a disturbance signal, which may describe a disturbance expected to disturb the water resource infrastructure. For example, the system may receive temperature data for a particular day showing particularly high temperatures which are expected to increase water demand in a particular area. The system may apply a pattern recognition algorithm to the received disturbance variables to generate a unique class for the disturbance signal into which similar future disturbance signals can be classified. The system may generate a simulation of the water resource infrastructure based on the disturbance and generate a schedule of setpoints for control mechanisms which may be actuable to control infrastructure components of the water resource infrastructure in pursuit of achieving the predetermined objective. For example, the schedule of setpoints may be generated to provide increased water flow to an area of high water demand to maintain efficiency of water delivery. The schedule of setpoints may be stored for future use, and labelled to correspond with the generated class of disturbance signals.

A system may then use the generated schedules of setpoints to make recommendations for controlling infrastructure components of the water resource infrastructure in real-time. The system may receive new disturbance data, generate a predicted disturbance signal, and attempt to classify the predicted disturbance signal into a predetermined class of disturbance signals for which a predetermined schedule of setpoints has already been generated. The appropriate schedule of setpoints may then be retrieved and outputted as a recommended schedule of setpoints for review by operating personnel, or directly executed by active infrastructure component control systems.

Figure 1:
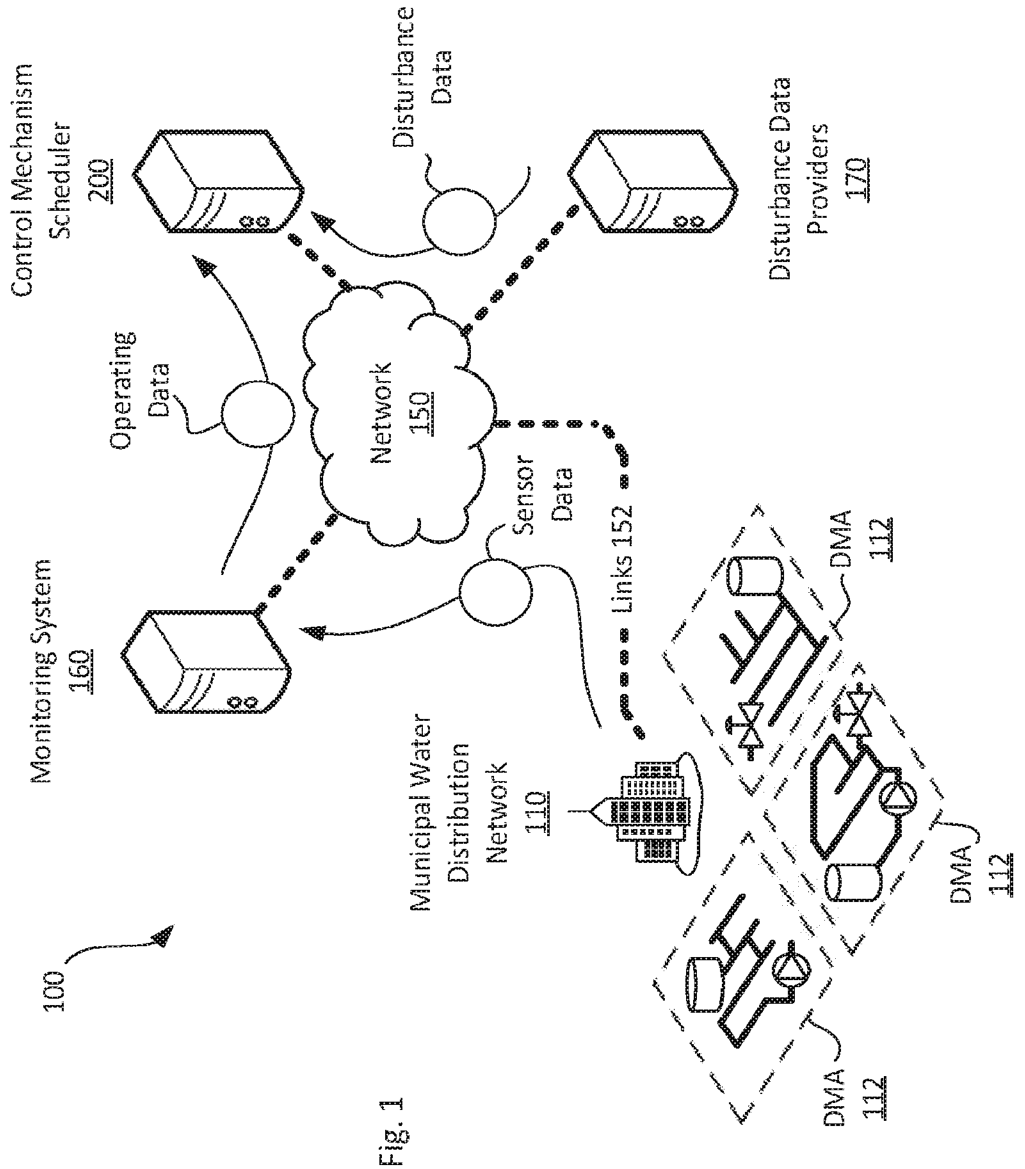
FIG. 1 is a schematic diagram of an example system for scheduling setpoints of control mechanisms of a water resource infrastructure.

FIG. 1 is a schematic diagram of an example of such a system. In FIG. 1, a system 100 includes a municipal water distribution network, hereinafter referred to as water resource infrastructure (WRI) 110. The WRI 110 includes various infrastructure components, including actuable infrastructure components which include control mechanisms which can be actuated to cause a change to the WRI 110. In the example shown, WRI 110 may include water reservoirs, water tanks, piping, water pumps, control valves, and other infrastructure components. The water tanks and reservoirs may serve as sources of water to be distributed around the WRI 110. The water pumps and control valves include control mechanisms which may be controlled to alter various properties of the WRI 110, such as water flow rates and pressure heads. The control valves may block or allow water flow to or from different areas of the WRI 110.

The WRI 110 may be divided into different district-metered-areas (DMAs) 112. The DMAs 112 may represent different commercial or residential areas of the municipality. These DMAs 112 may be divided according to the water-distribution capabilities of the municipality such that the water use of each OMA 112 may be controlled by actuable infrastructure components.

The system 100 further includes a monitoring system 160, disturbance data providers 170, and control mechanism scheduler 200, which are in communication over network 150. The monitoring system 160 includes one or more computing devices running a server application with storage, communication, and processing means. Similarly, the disturbance data providers 170 includes one or more computing devices running a server application with storage, communication, and processing means. Similarly, the control mechanism scheduler 200 includes one or more computing devices running a server application with storage, communication, and processing means. The network 150 includes a computing communication network such as the internet, a local-area network, a wide-area network, a wireless telecommunications network, a virtual private network, a combination of such, and similar.

The monitoring system 160 communicates with sensors which collect operating data related to the infrastructure components of the WRI 110 through links 152. This operating data may be transmitted from the sensors through communication links 152 and/or network 150 to the monitoring system 160. The monitoring system 160 may collect state variables describing states of infrastructure components. For example, state variables may include the on/off state or flowrate of a pump, the open/closed state or flowrate of a control valve, the water level of a water tank or reservoir, or the water pressure at various points in the WRI 110. The monitoring system 160 may also collect control variables which may be controlled to actuate control mechanisms of actual infrastructure components of the WRI 110. For example, control variables may include the on/off state of a pump or the open/closed state of a control valve. Certain control variables may be described as state variables in some contexts. In some examples, the monitoring system 160 may include a Supervisory Control and Data Acquisition (SCADA) system.

The disturbance data providers 170 provide disturbance data, which may include exogenous data describing disturbances or perturbations to the WRI 110, or any other disturbance data which may be expected to have an impact on operational parameters of infrastructure components of the WRI 110. For example, the disturbance data providers 170 may provide weather data, calendar data, or event data, relevant to the WRI 110. The calendar data may include information about large scale public events, such as concerts, sporting events, or public gatherings, which may be expected to impact water demand in WRI 110. For example, if a large sporting event is taking place in a particular OMA 112, an increased water demand may be expected at that OMA 112 at a certain time, corresponding with reduced demand in the other OMAs 112. The weather data may include temperature, humidity, and precipitation data which may similarly impact water demand in the WRI 110. For example, a hot and dry summer day may be expected to correspond with an increased water demand across each OMA 112.

The control mechanism scheduler 200 includes memory for storing operational data, disturbance data, disturbance signal patterns, simulations of the WRI 110, and control mechanism schedules. The control mechanism scheduler 200 trains to generate schedules of setpoints for control mechanisms, and retrieves and outputs these recommended schedules in response to receiving real-time operational data. These processes are discussed in greater detail with respect to FIGS. 3 and 4 below.

Figure 2:
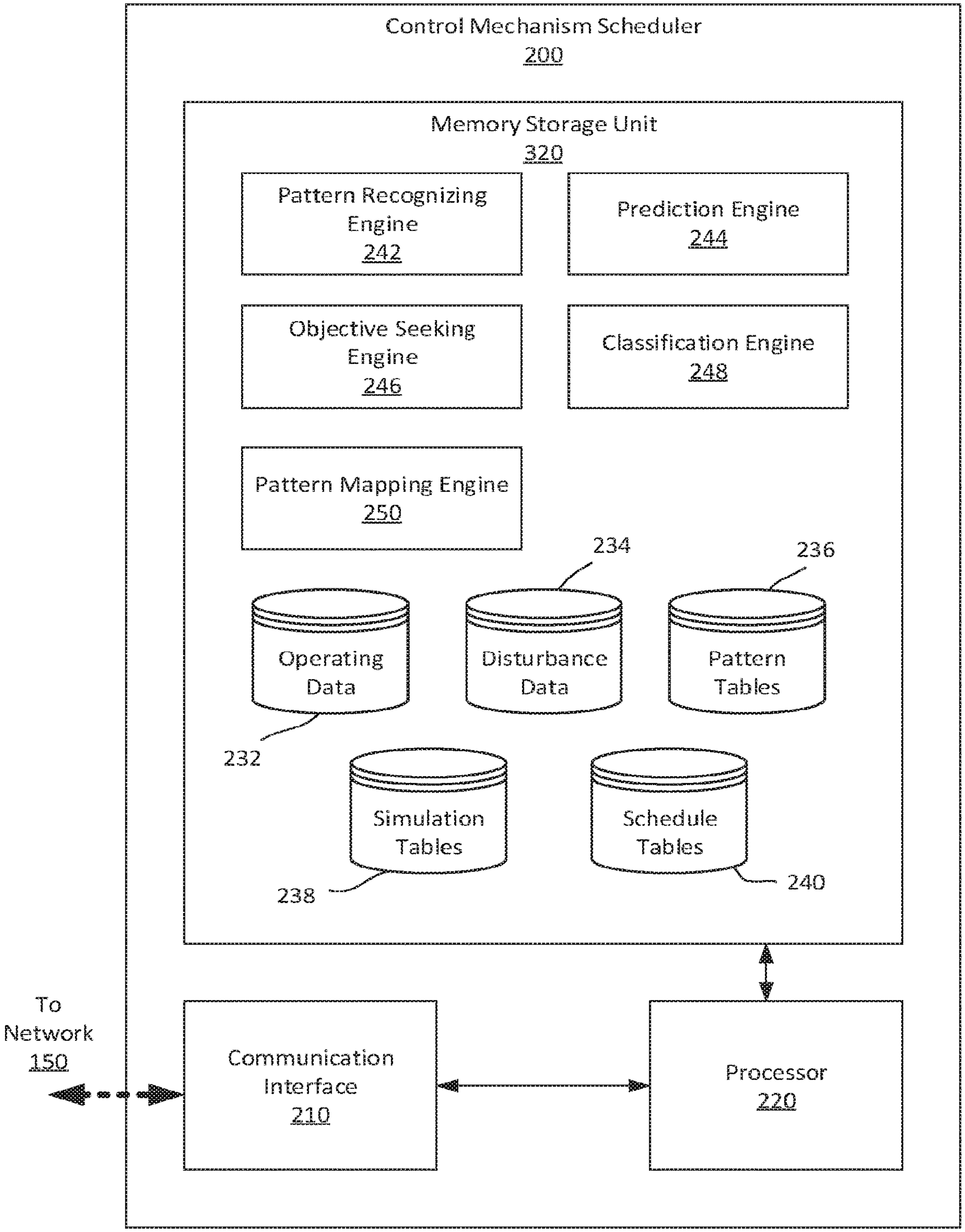
FIG. 2 is a block diagram of the functional components of an example control mechanism scheduler of the system of FIG. 1.

FIG. 2 is a block diagram of the functional components of an example control mechanism scheduler such as the control mechanism scheduler 200. The control mechanism scheduler 200 includes a communication interface 210, a processor 220, and a memory storage unit 230.

The communication interface 210 includes programming logic enabling the control mechanism scheduler 200 to communicate over network 150, is configured for bidirectional data communications through the network 150, and accordingly can include a network adaptor and driver suitable for the type of network. The communication interface 210 is configured to receive disturbance data from disturbance data providers 170 and operational data from monitoring system 160.

The memory storage unit 230 may include volatile storage and non-volatile storage. Volatile storage may include random-access memory (RAM) or similar. Non-volatile storage may include a hard drive, flash memory, and similar. The memory storage unit 230 includes operating data store 232, disturbance data store 234, pattern tables store 236, simulation tables store 238, and schedule tables store 240. The memory storage unit 230 further stores programming instructions for implementing the functional engines and modules, described below.

The processor 220 includes any quantity and combination of a processor, a central processing unit (CPU), a microprocessor, a microcontroller, a field-programmable gate array (FPGA), and similar. The processor 220 is in communication with the communication interface 210 and the memory storage unit 230, and can be configured to execute a pattern recognizing engine 242, a prediction engine 244, an objective-seeking engine 246, a classification engine 248, and a pattern mapping engine 250. The function of each of these engines described in greater detail below with respect to FIGS. 3 and 4.

Figure 3:
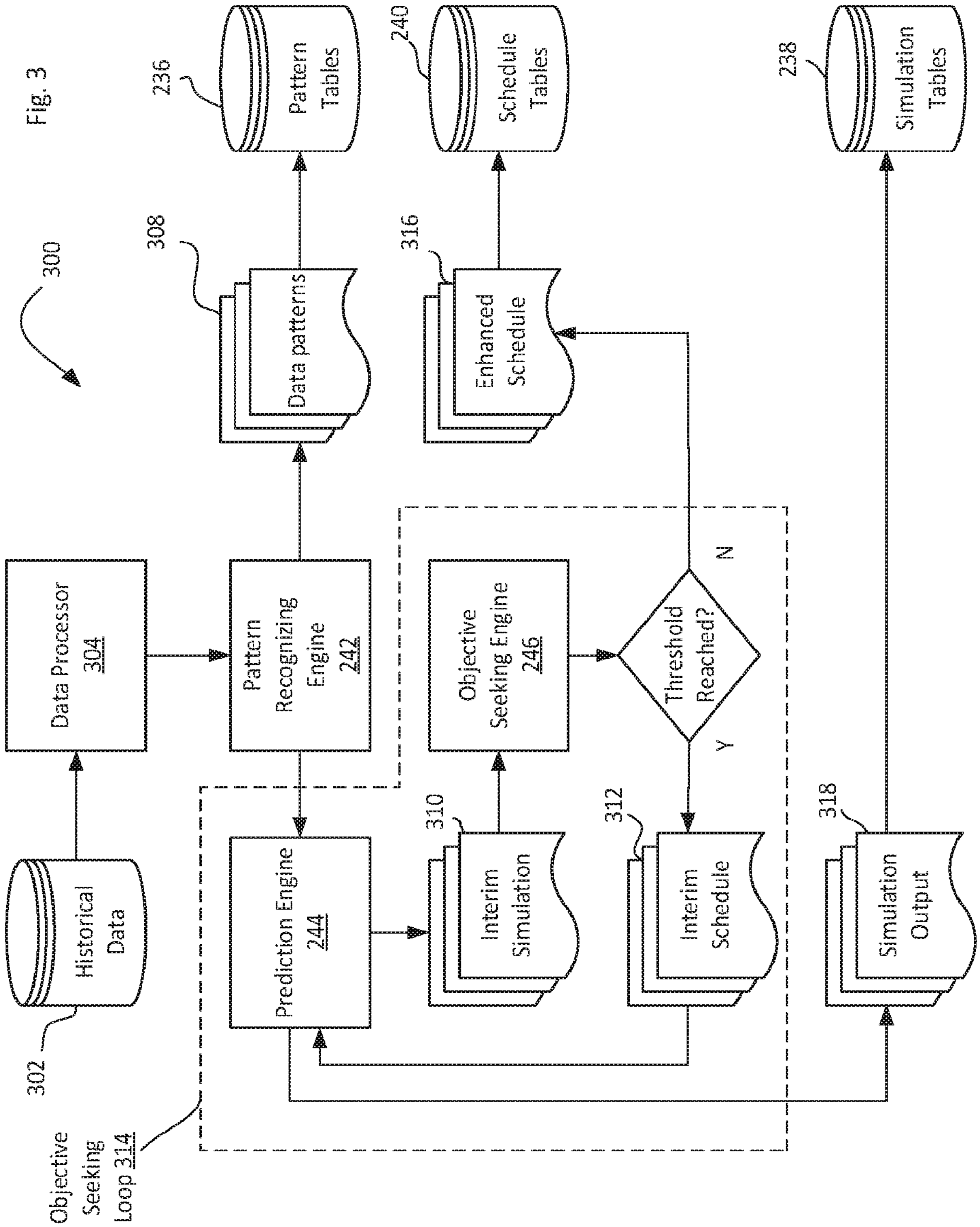
FIG. 3 is a schematic diagram of an example process for training a control mechanism scheduler of a water resource infrastructure.

FIG. 3 is a schematic diagram of an example process 300 for training a control mechanism scheduler such as the control mechanism scheduler 200. In process 300, the control mechanism scheduler 200 is trained to generate a schedule of setpoints for control mechanisms in accordance with approaching a predetermined objective. The objective may be, for example, to improve reliability, reduce maintenance downtime, or reduce operating costs. The training may take place while the control mechanism scheduler 200 is offline, i.e., not actively generating and outputting recommended schedules for control mechanisms. Portions of the training may also take place while the control mechanism scheduler 200 is online.

In process 300, historical data is received from historical data store 302 and ingested into a data processor 304. The historical operating data may include an archive dataset containing historical operating data of the WRI 110 and historical disturbance data. The historical data may include data from, for example, one year, two years, or larger or smaller sets of data.

The data processor 304 cleans or ingests the collected data in preparation for further analysis. The cleaning may include by extract, transform, load (ETL) methods, involving statistical imputation techniques for handling missing and erroneous data, smoothing noisy signals, and alarms for indicating sensor faults. In some examples, the cleaned dataset may be standardized into Z notation so that effects are properly scaled regardless of the units and magnitudes of each datum received. In some examples, the dataset may be stored locally, at a cloud computing device, in a database, or in flash storage for later use.

The disturbance variables from the historical data are extracted and consumed by pattern recognizing engine 242. The pattern recognizing engine employs a pattern recognition algorithm to generate unique classes corresponding to patterns recognized in the disturbance data, indicated as data patterns 308. The data patterns 308 may be stored in pattern tables store 236. These classes are used to recognize disturbance signals when they are observed in the future.

The pattern recognizing engine 242 may include a clustering engine. In examples where the pattern recognizing engine 242 includes a clustering engine, the pattern recognizing engine 242 employs an algorithm to decompose the multi-dimensional disturbance signal in the disturbance variables into lower dimensions such that it can be clustered, and the pattern recognizing engine 242 employs a clustering engine to cluster the lower-dimension disturbance data to generate classes of identifiable data clusters corresponding to the disturbance signal.

The algorithm used to decompose the disturbance signal into lower dimensions may include principal component analysis (PCA) or t-distributed Stochastic Neighbor Embedding (t-SNE).

The clustering engine may employ a K-Means, Affinity Propagation, spectral clustering, or ward agglomerative clustering algorithm. In some examples where a pre-determined number of clusters is expected, a K-Means algorithm may be employed. In examples without having a pre-determined number of expected clusters, an Affinity Propagation algorithm may be used. In some examples where Affinity Propagation is used, a damping value of about 0.5 may be used. In other examples in which the data to be clustered is of particularly varied density, spectral clustering or ward agglomerative clustering may be used. Other clustering algorithms are contemplated.

The historical data may also be used for initial training of the prediction engine 244. In some examples, the prediction engine 244 may include a hierarchical learning model having a recursive hierarchical layered design whereby each infrastructure component of WRI 110 is represented by a machine learning driven regression estimator describing operating parameters of an infrastructure component of the WRI 110. The regression estimators may be interconnected recursively in a directed graph in the hierarchical learning model. By decomposing the large and complex WRI 110 into smaller, linked infrastructure components, each of which can be modeled directly, strong prediction quality and computational efficiency may be achieved.

The prediction engine 244 may include a predictive modelling algorithm such as gradient boosted decision tree algorithms, random forest algorithms, multi-layer perception (MLP) algorithms, deep learning algorithms, support vector machine algorithms, or other appropriate ensemble-based machine learning algorithms.

The prediction engine 244 generates an interim simulation 310 of the WRI 110 comprising interim state variables (e.g., the predicted water level in a storage tank).

The objective-seeking engine generates an interim schedule 312 of setpoints of control mechanisms of infrastructure components. The interim schedule 312 is generated based on an algorithm with the objective of enhancing the output of an objective function relating to an improved state of operation of the WRI 110, such as reducing maintenance downtime, or reducing a cost function relating to the infrastructure components (e.g., electricity costs), until an appropriate threshold is reached. In some examples, the algorithm employed by the objective-seeking engine 246 may include an optimization algorithm designed to reduce or increase a variable, such as cost or energy use. The objective-seeking engine may be programmed to constrain the outputted interim schedules 312 by pre-defined regulatory constraints mandated in the WRI 110, such as maximum pressure levels or minimum water storage levels. In some examples, the interim schedules 312 may provide on/off instructions for a plurality of infrastructure components. For example, interim schedules 312 may provide on/off instructions for various pumps or control valves in the WRI 110. The interim schedules 312 may be organized by daily, hourly, or other intervals.

Where the objective-seeking engine 246 employs an optimization algorithm, the optimization algorithm employed may comprise, for example, a population-based, stochastic, or metaheuristic optimization method.

After an initial simulation, the prediction engine 244 iterates with objective-seeking engine 246 to generate additional interim simulations 310 in response to the interim schedules 312 of setpoints of control mechanisms. This loop is indicated as objective-seeking loop 314.

When an interim schedule 312 is generated that satisfies the objective function within a certain threshold, an enhanced schedule 316 of setpoints is outputted, which may be stored in schedule tables store 240. A final simulation output 318 may also be outputted and stored in simulation tables store 238. These schedules and simulations may be stored for later use during online operation.

Determination of whether a threshold has been reached may be understood as meaning that any further iteration of the objective-seeking loop 314 is expected to have negligible impact on the interim schedules 312. As such, an objective function may be referred to as having been optimized when such a threshold is reached, without reaching a theoretical optimal solution. For example, where a variable or objective function is said to be optimized or minimized, in some applications, obtaining a result within about 20% of the theoretical optimal result, or in other applications within about 10% of the theoretical optimal result, or in other applications within about 1% of the theoretical optimal result, or in still other application within about 0.1% of the theoretical optimal result, may be appropriate in the given case, and still constitute reaching an appropriate threshold. Generally, the terms "optimal" or "optimized" may be used to refer to the state of having met such a threshold.

In examples where the pattern recognizing engine 242 employs a clustering algorithm, the objective-seeking loop 314 may be repeated for each centroid of the previously identified data clusters until each data cluster has an enhanced control schedule associated with it.

In some examples, the objective-seeking loop 314 may be performed in parallel in a Master-Slave architecture for converging toward an enhanced solution. For example, a high-performance computing (HPC) architecture may be employed. A typical HPC architecture comprises a cluster of nodes interconnected via a high-throughput, low latency network. As such, using a system of 'm' computational nodes, a Master-Slave Architecture is adopted whereby one (1) node is demarcated as the Master and the remaining 'm−1' are Slaves. In this parallelization construct, the Master Node is used to distribute messages to each Slave node. Each message consists of two parts: (i) control variables in the context of optimization; and (ii) an envelope which contains the rank of the sender and receiver and a data stream tag. The tag serves the purpose of demarcating different messages being passed between the same senders and receivers. Each Slave has its own local memory and evaluates the message with a predefined objective function asynchronously and independently of the others.

In some examples, the outputs of the iteration of the prediction engine 244 and the objective-seeking engine 246 may be validated. The validation process may involve assessing the optimality of the setpoints produced by the objective-seeking engine 246, as well as the interim prediction accuracy of the model predictions produced by the prediction engine 244. In the event that the prediction accuracy has deteriorated beyond a tolerance threshold, an alert may be triggered indicating that the model is to obtain additional training.

FIG. 4 is a schematic diagram of an example process 400 for generating a schedule of setpoints of control mechanisms of a water resource infrastructure. The process employs a control mechanism scheduler, such as control mechanism scheduler 200, to generating schedules of setpoints for control mechanisms of infrastructure components in real-time.

In process 400, a real-time data stream is ingested in real-time and stored temporary in real-time data store 402 for further processing. The real-time data may include a dataset containing real-time operating data of the WRI 110 and real-time disturbance data. It is to be understood that the term "real-time data" may be used to refer to near-real-time data inputs that may be received in a stream or batches that relates to recent or near-real time information and is not intended to be limiting.

Data processor 404 cleans or ingests the collected data in preparation for further analysis. The data processor 404 may be similar, or identical to, data processor 304, and may employ similar methods.

The disturbance data in the real-time data is fed into a disturbance module of the prediction engine 244. The disturbance module of the prediction engine 244 generates a predicted disturbance signal 406 based on the disturbance variables in the disturbance data.

The predicted disturbance signal 406 is fed into a classification engine 248 for classification as a pre-determined class of disturbance signals, which may be stored in pattern tables store 236. The classification engine may employ an algorithm to decompose the signal into lower dimensions enabling it to be classified. The algorithm used to decompose the disturbance signal into lower dimensions may include principal component analysis (PCA) or t-distributed Stochastic Neighbor Embedding (t-SNE). In some examples, a multi-output regression map may be used to map real-time data to reduce storage space requirements.

Where classification of the predicted disturbance signal 406 is unsuccessful, the new pattern pathway 410 is followed. Where classification of the predicted disturbance signal 406 is successful, the retrieval pathway 420 is followed.

Under the new pattern pathway 410, when a new disturbance signal is detected, the pattern recognizing engine 242 attempts to recognize a new pattern in the new signal. The new data pattern 308 is stored in pattern tables store 236. Where a clustering algorithm is employed, the signal is transformed into a new data cluster classification, which is stored.

The newly formed data pattern 308 is fed into the prediction engine 244 and objective-seeking engine 246 and iterated, as indicated by objective-seeking loop 314. Understanding of the objective-seeking loop 314 may be had with reference to FIG. 3.

The objective-seeking engine 246 generates and outputs an enhanced schedule 316 of setpoints, and the prediction engine 244 generates and outputs a simulation output 318. The outputs are stored in schedule tables store 240 and simulation tables store 238, with the particular enhanced schedule 316 associated with the particular disturbance signal 406.

Under the retrieval pathway 420, when the predicted disturbance signal 406 is recognized by the classification engine 248 as corresponding to a pre-determined class of disturbance signals, a pattern mapping engine 250 retrieves and outputs the associated enhanced schedule 316. The enhanced schedule 316 is stored in schedule tables store 240. The prediction engine 244 also generates a simulation output 318 given the enhanced schedule 316. The simulation output is stored in simulation tables store 238.

The enhanced schedule 316 of control mechanisms and/or the stimulation output 318 may be transmitted to and outputted. These outputs may be used to make recommendations to operators of active control systems which may actively control infrastructure components of the WRI 110. For example, the outputs may be transmitted to a display device for review by infrastructure component operators. The display device may display a 24-hour schedule based on the enhanced schedule 316 of the on/off states of each pump, control valve, and other active component for the next 24 hours. Alternatively, the enhanced schedule 316 may directly feed into an active control system to actively operate the infrastructure components.

The availability of the new pattern pathway 410 and the retrieval pathway 420 provides speed, flexibility, and resiliency to the control mechanism scheduler 200. A proportion of the incoming real-time data may include disturbance signals which may be quickly recognized and classified by classification engine 248 for the retrieval of a pre-determined enhanced schedule 316, allowing the control mechanism scheduler 200 to operate with a high degree of responsiveness to changing incoming disturbance data. A proportion of the incoming real-time data, however, may include disturbance signals which are unrecognized, at which point the classification engine 248 may process the new disturbance signal under the new pattern pathway 410 to both generate a new enhanced schedule 316 for current use, as well as for future use under the retrieval pathway 420.

FIG. 5 is a schematic diagram of an example process 502 for generating a simulation of the water resource infrastructure of FIG. 1. The process 502 involves operation of functional modules of a prediction engine of a control mechanism scheduler, such as prediction engine 244 of control mechanism scheduler 200.

The prediction engine 244 includes a disturbance module 510 for predicting disturbances to the WRI 110. For example, disturbances to the WRI 110 may include water demand. The prediction engine 244 includes a pump module 520 for predicting pump flow rates and response time. The prediction engine 244 includes a storage or tank module 530 for predicting storage tank water levels. The prediction engine 244 includes a pressure module 540 for predicting the system pressure response to the tank levels and other infrastructure components affecting pressure.

For a WRI having N elements for each infrastructure component (e.g., N pumps), the prediction engine 244 may comprise N modules for the N elements (e.g. N pumping modules for N pumps, each pumping module capturing the specific behavior of each pump). Each module may generate its output prediction across a future timeframe so that a scheduling of setpoints of control mechanisms can be determined. In some examples, each module may predict its output for every hour for the next 24 hours. In other examples, each module may predict the next 24 hours in 15 minute increments, or may predict the next 12 hours, or the next 48 hours, or other similar timeframe, at any similar increment.

In the present example, the disturbance module 510 predicts water demand at each OMA 112 in WRI 111 and total aggregated system water demand. Disturbance module 510 has as inputs exogenous disturbance data from disturbance data store 234 which may impact WRI 101. For example, disturbance data may include the time of day, day of the week, month, and dates of national holidays, dates of major events, and weather data, which may include temperature, precipitation index, and aridity index. Disturbance module 510 has as outputs the predicted water demand flowrate (Q) at each OMA (k), from the current time to the prediction time (T) ($Q^k_1, \ldots, Q^k_{t+T}$)— Output from disturbance module 510 may be presented as an N×24 matrix, where N is the number of DMAs in WRI 111, each having a predicted flowrate for the next 24 hours. In other embodiments in which, for example, the next 24 hours are forecasted in 15 minute intervals, the output may be presented as an N×96 matrix, or other suitably sized matrix appropriate to the forecasting schedule, and so on.

Pump module 520 predicts pump flowrate at each pump in WRI 110. A pump's behavior is controlled by its system head-curve, pump operating curve (head-flow), and efficiency curve (efficiency-flow). A pump's behavior also considers non-linear dynamics including lagged response time, since a pump will not achieve a set steady-state flowrate instantaneously. The objective of pump module 520 may be to map on/off statuses of pump 120 to the pump's production flowrate considering its lagged response time. Pump module 520 has as inputs the water demand flowrates calculated by the disturbance module 510, the pressure heads calculated by pressure module 540 (discussed below), the on/off state of the water pumps in WRI 110, the water pressure at each OMA 112, and the open/closed state of the control valves in WRI 110. Pump module 520 has as outputs the pump flowrate (Q) at each pump (k), from the current time to the prediction time (t+T) ($Q^k_1, \ldots, Q^k_{t+T}$). Output from pump module 520 may be presented as a matrix as appropriate and consistent with disturbance module 510.

Tank module 530 maps the tank level at each time (t) of each water storage tank (k) to the tank level at time (t+1) based on pump flowrate and water demand at time (t) in order to determine the equalization flow required from each storage tank to achieve mass balance for updating the tank level for time (t+1). Tank module 530 has as inputs pump flowrates calculated by pump module 520, water demand flowrates calculated by disturbance module 510, and current storage tank heights. Tank module 530 has as output the change in tank level ($L^k_1, \ldots, L^k_{t+T}$). Output from tank module 530 may be presented as a matrix as appropriate and consistent with the other modules.

Pressure module 540 predicts the average system pressures at each OMA 112 at time (t). Pressure module 540 has as inputs the change in tank levels calculated by tank module 530, water demand flowrates at each OMA 112 calculated by disturbance module 510, tank levels, and pump flowrates calculated by pump module 520. Pressure module 540 has as outputs the predicted water pressure at each OMA 112 at time (t). Output from pressure module 540 may be presented as a matrix as appropriate and consistent with the other modules.

Figure 6:
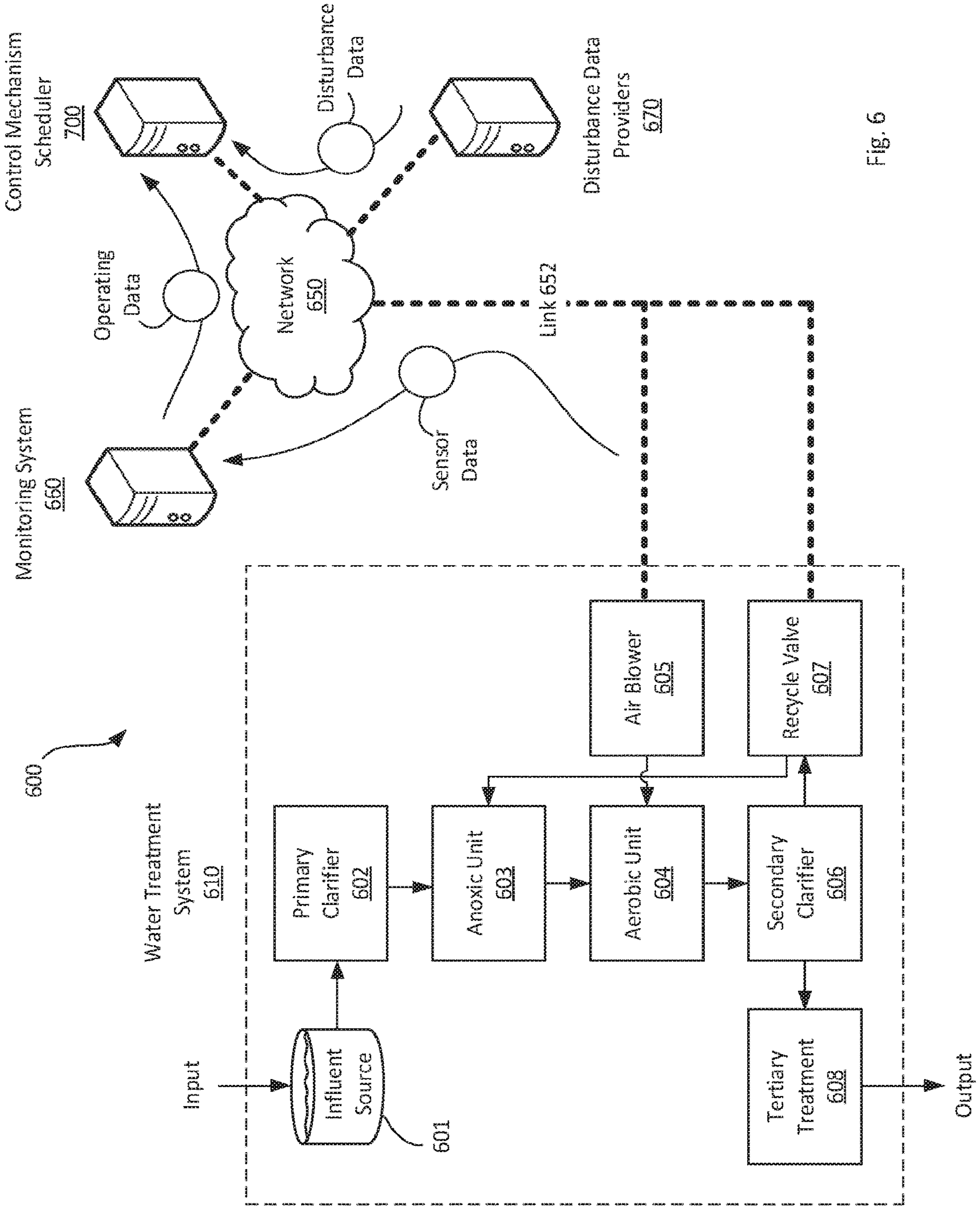
FIG. 6 is a schematic diagram of another example system for scheduling setpoints of control mechanisms of a water resource infrastructure.

FIG. 6 is a schematic diagram of another example system 600 for scheduling setpoints of control mechanisms of another WRI. System 600 includes a water treatment system, hereinafter referred to as WRI 610. The WRI 610 includes comprising an influent source 601, a primary clarifier 602, anoxic unit 603, aerobic unit 604 having air blowers 605, a secondary clarifier 606 having a recycle valve 607, and tertiary treatment system 608.

The system 600 also includes a monitoring system 660, links 652, disturbance data providers 670, control mechanism scheduler 700, and network 650. General description of monitoring system 660, links 652, disturbance data providers 670, control mechanism scheduler 700, and network 650 may be had with reference to the analogous components of system 100.

In system 600, wastewater to be treated flows from the influent source 601 through the primary clarifier 602, anoxic unit 603, aerobic unit 604, and secondary clarifier 606, and tertiary treatment systems 608.

Monitoring system 660 includes links 652 to sensors on air blower 605 and recycle valve 607. The air blower 605 and recycle valve 607 comprise actuable infrastructure components which are monitored by sensors which transmit sensor data to monitoring system 660, which also include control means for which a schedule of setpoints may be generated. The monitoring system 660 is also connected to other sensors in WRI 610 which measure states of the WRI 610 such as chemical analyzers measuring key chemical parameters in the wastewater treatment, and flowmeters. For simplicity, however, only the connections which correspond to the control mechanisms of the air blower 605 and recycle valve 607 are shown.

Monitoring system 660 may record the air flowrate of the air blower 605 and the recycle flow rate through recycle valve 607, the on/off state of air blower, and the open/closed state of recycle valve 607. The air flow rate through air blower 605 and the flow rate of recycled wastewater from secondary clarifier 606 to anoxic unit 603 are examples of some state variables which describe the state of the WRI 301. The on/off state of air blower 605 and the open cross-section of recycle valve 607 are examples of setpoints. Disturbance data providers 670 records disturbance data such as calendar data and weather data, such as the kind described above, which may impact WRI 610.

The control mechanism scheduler 700 may include functional components analogous to those shown in FIG. 2, and may function in the same way to be trained to generate schedules of setpoints for control mechanisms of infrastructure components of WRI 610. Thus, the control mechanism scheduler 700 may include a prediction engine which runs a process to generate simulations of the WRI 110.

FIG. 7 is a schematic diagram of an example of such a process 702. The prediction engine of control mechanism scheduler 700 may include an influent module 710 which predicts influent flowrate and composition, an anoxic module 720 which predicts anoxic states, an aerobic module 730 which predicts aerobic states, and an effluent module 740 which predicts effluent states.

For a WRI having N elements for each unique infrastructure component (e.g. N unique anoxic units), the prediction engine may include N modules for the N elements. Each module may predict its output across a future timeframe so that a scheduling of setpoints can be generated. In some examples, each module predicts its output for every hour for the next 24 hours or other time interval.

In process 702, influent module 710 predicts influent states. Influent module 710 has as inputs disturbance data which may impact WRI 610. In some examples, inputs to influent module 710 may include calendar data, which may include the time of day, day of the week, month, and dates of national holidays, dates of major events, and temperature data, which may include temperature, precipitation index, and aridity index. Influent module 710 may have as outputs the predicted influent states (Z) at the influent node, from the current time to the prediction time (T) ($Z_1, \ldots, Z_{t+T}$)—Output from Influent module 710 may be presented as a 1×(24×M) matrix, where M is the number of sampling intervals in any given hour for the next 24 hours.

Anoxic module 720 predicts anoxic states. Anoxic module 720 may have as inputs the influent calculated by influent module 710 and the effluent states predicted by the effluent module 740 (discussed below). Anoxic module 720 may have as outputs the predicted anoxic states.

Aerobic module 730 predicts aerobic states. Aerobic module 730 may have as inputs the anoxic states calculated by anoxic module 720, disturbance data, and the influent states as calculated by the influent module 710. Aerobic module 730 has as outputs the predicted aerobic states.

Effluent module 740 predicts effluent states. Effluent module 740 may have as inputs the aerobic states as calculated by aerobic module 730, and the influent states as calculated by the influent module 710. The effluent module 740 may have as outputs effluent states.

It is contemplated that, in other examples, other modules pertaining to other key infrastructure components (e.g., other processing equipment) may be employed in similar or other WRIs, such as drinking water treatment plants or sewage collection systems. It is contemplated that key infrastructure components may be selected for inclusion or exclusion from the hierarchical learning model based on the WRI.

It should thus be apparent from the above that a system may be trained to generate a schedule of setpoints for control mechanisms in accordance with approaching a predetermined objective, and the system may generate schedules of setpoints in real-time, for review by operating personnel or for direct control of infrastructure components of the WRI. Disturbance data may be used to predict disturbances in the WRI, which may be used to generate a predictive model of the WRI, which may subsequently be used to generate a schedule of setpoints to respond to the disturbance. The system may model the WRI and the infrastructure components therein using recursively connected predicted modules for key infrastructure components in a hierarchical learning model to achieve strong prediction quality and computational efficiency.

The scope of the claims should not be limited by the embodiments set forth in the above examples, but should be given the broadest interpretation consistent with the description as a whole.

What is claimed is:

1. A system for controlling a water resource infrastructure (WRI), the system comprising:

(a) the water resource infrastructure (WRI) comprising infrastructure components, wherein at least one of the infrastructure components is actuatable to cause a change to the WRI;

(b) a monitoring system comprising a first computing device that communicates with one or more sensors that collect operating data related to the infrastructure components, wherein the operating data comprises a state of the infrastructure components;

(c) a disturbance data provider comprising a second computing device that provides disturbance data that may be expected to have an impact on operational parameters of the infrastructure components;

(d) a control mechanism scheduler comprising a third computing device that:

(i) receives the disturbance data from the disturbance data provider;

(ii) receives the operating data from the monitoring system;

(iii) trains to generate a schedule of setpoints for a control system that controls the at least one infrastructure component that is actuatable, wherein:

(1) the schedule of setpoints is in accordance with approaching a predetermined objective and is based on the received disturbance data;

(2) the training generates the schedule of setpoints by generating a simulation of the WRI by operating functional modules of a prediction engine, wherein:

(A) the prediction engine predicts a disturbance to the WRI;

(B) the prediction engine predicts a behavior of the at least one infrastructure component across a future time frame based on the predicted disturbance and predicted actuation of the at least one infrastructure component;

(C) the prediction engine generates an output prediction across the future timeframe so that the schedule of setpoints can be determined;

(iv) retrieves and outputs the schedule of setpoints in response to receiving real-time operational data, wherein the real-time operational data includes real-time disturbance data; and (e) a control system that:

(i) comprises the at least one infrastructure component that is actuable;

(ii) receives the schedule of setpoints; and (iii) controls the infrastructure components based on the received schedule of setpoints.

2. The system of claim 1, wherein:

the disturbance data received by the control mechanism scheduler comprises historical disturbance data;

the operating data received by the control mechanism scheduler comprises historical operating data from a defined time period; and a pattern recognizing engine executed by a processor that generates unique classes corresponding to patterns recognized in the historical disturbance data.

3. The system of claim 2, wherein:

the pattern recognizing engine generates the unique classes based on clustering.

4. The system of claim 2, wherein:

the historical disturbance data and historical operating data are used for initial training of a prediction engine;

each infrastructure component is represented by a machine learning driven regression estimator that describes operating parameters of the infrastructure component; and the machine learning driven regression estimator is interconnected recursively in a directed graph of a hierarchical learning model.

5. The system of claim 1, wherein the control mechanism scheduler trains to generate the schedule of setpoints by:

generating interim simulations of the water resource infrastructure;

generating interim schedules of setpoints in accordance with approaching the predetermined objective; and iterating the generation of the interim schedules and generation of the interim simulations until the predetermined objective is reached within a predetermined threshold.

6. The system of claim 1, wherein at least some of the disturbance data is expected to impact water demand in the water resource infrastructure.

7. The system of claim 1, wherein the control system:

receives a new disturbance signal;

classifies the new disturbance signal into a first unique class of one or more unique classes for which the schedule of setpoints has already been generated;

retrieves the schedule of setpoints associated with the first unique class; and controls the infrastructure components based on the retrieved schedule of setpoints.

8. The system of claim 1, wherein the the prediction engine predicts:

water demand;

pump flow rates and response time;

storage tank water levels; and system pressure response to the storage tank water levels and other infrastructure components that affect pressure.

9. A method for controlling a water resource infrastructure (WRI), the method comprising:

(a) collecting, via sensors of a monitoring system, operating data related to infrastructure components of the WRI, wherein the operating data comprises a state of the infrastructure components, and wherein at least one of the infrastructure components is actuatable to cause a change to the WRI;

(b) receiving, into a control mechanism scheduler, disturbance data from a disturbance data provider, wherein the disturbance data comprises data that is expected to have an impact on operational parameters of the infrastructure components;

(c) receiving, into the control mechanism scheduler, operating data from the monitoring system;

(d) the control mechanism scheduler training to generate a schedule of setpoints for a control system that controls the at least one infrastructure component that is actuatable, wherein:

(i) the schedule of setpoints is in accordance with approaching a predetermined objective and is based on the received disturbance data;

(ii) the training generates the schedule of setpoints by generating a simulation of the WRI by operating functional modules of a prediction engine, wherein:

(1) the prediction engine predicts a disturbance to the WRI;

(2) the prediction engine predicts a behavior of the at least one infrastructure component across a future time frame based on the predicted disturbance and predicted actuation of the at least one infrastructure component;

(3) the prediction engine generates an output prediction across the future timeframe so that the schedule of setpoints can be determined;

(e) the control mechanism scheduler retrieving and outputting the schedule of setpoints in response to receiving real-time operational data, wherein the real-time operational data includes real-time disturbance data;

(f) a control system, comprising the at least one infrastructure component that is actuable, receiving the schedule of setpoints; and (g) the control system controlling the infrastructure components, including the at least one actuable infrastructure component, based on the received schedule of setpoints.

10. The method of claim 9, wherein:

the disturbance data received by the control mechanism scheduler comprises historical disturbance data;

the operating data received by the control mechanism scheduler comprises historical operating data from a defined time period; and a pattern recognizing engine generates unique classes corresponding to patterns recognized in the historical disturbance data.

11. The method of claim 10, wherein:

the pattern recognizing engine generates the unique classes based on clustering.

12. The method of claim 10, wherein:

the historical disturbance data and historical operating data are used for initial training of a prediction engine;

each infrastructure component is represented by a machine learning driven regression estimator that describes operating parameters of the infrastructure component; and the machine learning driven regression estimator is interconnected recursively in a directed graph of a hierarchical learning model.

13. The method of claim 9, wherein the control mechanism scheduler trains to generate the schedule of setpoints by:

generating interim simulations of the water resource infrastructure;

generating interim schedules of setpoints in accordance with approaching the predetermined objective; and iterating the generation of the interim schedules and generation of the interim simulations until the predetermined objective is reached within a predetermined threshold.

14. The method of claim 9, wherein at least some of the disturbance data is expected to impact water demand in the water resource infrastructure.

15. The method of claim 9, wherein the control system:

receives a new disturbance signal;

classifies the new disturbance signal into a first unique class of one or more unique classes for which the schedule of setpoints has already been generated;

retrieves the schedule of setpoints associated with the first unique class; and controls the infrastructure components based on the retrieved schedule of setpoints.

16. The method of claim 9, wherein the prediction engine predicts:

water demand;

pump flow rates and response time;

storage tank water levels; and system pressure response to the storage tank water levels and other infrastructure components that affect pressure.

* * * * *